United States Patent [19]

Sawasaki et al.

[11] Patent Number: 5,042,325

[45] Date of Patent: Aug. 27, 1991

[54] CONTROL SYSTEM FOR STEPLESSLY VARIABLE POWER TRANSMISSION

[75] Inventors: Tomoo Sawasaki; Takashi Nogami, both of Hiroshima, Japan

[73] Assignee: Mazda Motor Corporation, Hiroshima, Japan

[21] Appl. No.: 547,248

[22] Filed: Jul. 3, 1990

[30] Foreign Application Priority Data

Jul. 6, 1989 [JP] Japan ................................. 1-175268

[51] Int. Cl.$^5$ ............................................. B60K 41/14
[52] U.S. Cl. ......................................... 74/866; 74/851; 74/858; 74/859; 74/872; 474/12
[58] Field of Search ................. 74/851, 854, 855, 858, 74/859, 866, 867, 872; 474/12, 17, 69, 70

[56] References Cited

U.S. PATENT DOCUMENTS

| 4,403,527 | 9/1983 | Mohl et al. ............................ 74/851 |
| 4,515,040 | 5/1985 | Takeuchi et al. ................... 74/859 X |
| 4,543,077 | 9/1985 | Yamamuro et al. .................... 474/12 |
| 4,631,043 | 12/1986 | Tokoro et al. ..................... 474/28 X |
| 4,716,788 | 1/1988 | Kita ........................................ 74/858 |
| 4,736,301 | 4/1988 | Osanai ................................ 474/12 X |
| 4,923,433 | 5/1990 | Tanaka et al. ..................... 474/28 X |
| 4,945,483 | 7/1990 | Tokoro .............................. 474/12 X |

FOREIGN PATENT DOCUMENTS 62-52260  3/1987  Japan .

Primary Examiner—Allan D. Herrmann
Assistant Examiner—Benjamin Levi
Attorney, Agent, or Firm—Fleit, Jacobson, Cohn, Price, Holman & Stern

[57] ABSTRACT

A control system for a steplessly variable transmission comprising a drive pulley and driven pulley formed with V-shaped grooves respectively, an endless belt engaged with the both grooves of the pulleys and tensioned between the pulleys to transmit engine torque therethrough, cylinders provided on the pulleys for being subjected to a hydraulic pressure to vary an effective diameter of the pulleys so that a speed ratio of the transmission is continuously changed, a hydraulic pressure supply device for introducing the hydraulic pressure into the cylinder means, a line pressure control device for controlling a line pressure of a hydraulic circuit which controls operation of the cylinders, a line pressure detecting device for detecting the line pressure, a torque detecting device for detecting the engine torque transmitted to the drive pulley, a torque allowance computing device for computing a maximum allowable belt transmitting torque which is effectively transmitted from the drive pulley to the driven pulley through the belt under the line pressure detected by the line pressure detecting device, and the torque control device for controlling a torque transmitted from the drive pulley to the driven pulley to a value smaller than the maximum torque when the engine torque detected by the torque detecting device is greater than the maximum torque. When a line pressure of a hydraulic control circuit therefor is unduly lowered, the slip between the drive and driven pulleys can be effectively suppressed.

9 Claims, 6 Drawing Sheets

CONTROL SYSTEM FOR STEPLESSLY VARIABLE POWER TRANSMISSION

CROSS-REFERENCE TO THE RELATED APPLICATIONS

The present application relates to co-pending U.S. patent application Ser. No. 400,922 filed on Aug. 30, 1989 entitled "HYDRAULIC CONTROL SYSTEM FOR STEPLESSLY VARIABLE TRANSMISSION", U.S. patent application Ser. No. 466,231 filed on Jan. 19, 1990, entitled "HYDRAULIC TRANSMISSION CONTROL SYSTEM" which are assigned to the same assignee as the present application.

BACKGROUND OF THE INVENTION

1. Field of the Invention

The present invention relates to a control system for a steplessly variable power transmission.

2. Description of the Prior Art

There have been known a steplessly variable power transmission provided with a drive pulley, a driven pulley and an endless belt applied to V-shaped grooves formed on the drive and driven pulleys so that an engine power is transmitted to a wheel driving system with a given speed ratio (drive pulley rotation speed/driven pulley rotation speed) which can be continuously varied. The speed ratio in the steplessly variable power transmission is continuously varied in a manner that a hydraulic pressure which is controlled by solenoid valve is applied for control cylinders of the drive and driven pulleys to change widths of the grooves thus changing an effective diameter of the pulleys. As a result, a torque transmitted through the transmission is changed in accordance with the hydraulic pressure applied to the control cylinders of the pulleys.

In the steplessly variable power transmission, it is required to minimize the slip rate of the belt and prevent the damage thereof. Thus, it is necessary to keep a grip pressure applied to the belt by the pulleys at a proper value in response to the torque transmitted. For this purpose, it has been known that a solenoid valve for controlling a line pressure of a hydraulic circuit is controlled in accordance with engine speed, the speed ratio and the like so that the pressure applied to the belt through the pulleys is controlled to correspond to the torque transmitted therethough.

With this pressure control for the pulleys, it should however be noted that when some abnormalities occur in a control signal for the solenoid valve or in operation of the solenoid valve, the hydraulic pressure applied to the control cylinders for the pulleys could not be maintained at a proper value. In this case, the grip pressure for the pulleys would be unduly lowered to produce undesirable slip of the belt. In view of this, Japanese Patent Public Disclosure No. 62-52260, laid open to the public on Mar. 6, 1987, discloses a control system of the grip pressure for the belt in which when the line pressure of the hydraulic circuit is lowered below a predetermined value, the hydraulic pressure applied to the belt is controlled to a value corresponding to a spring force in the solenoid valve, or a minimum pressure, and a torque transmitted from the engine to the transmission through a magnetic clutch is controlled to a value smaller than a torque transmitted through the belt under a condition of the minimum hydraulic pressure with the maximum rotation ratio of the transmission (driven pulley rotation speed/drive pulley rotation speed). Namely, in this control, the engine torque transmitted to the drive pulley is controlled as low as possible to suppress the slip between the belt and the pulleys.

It should however be noted that in this control, a drivablility of vehicle may be deteriorated since the torque transmitted through the transmission is minimized.

SUMMARY OF THE INVENTION

It is therefore a primary object of the present invention to provide a control system for a steplessly variable transmission in which the drivability of the vehicle is not deteriorated even when some abnormalities are produced to unduly lower the line pressure of the hydraulic circuit of the control cylinders of the drive and driven pulleys of the transmission.

It is another object of the present invention to provide a control system for the steplessly variable transmission in which a slip between the belt and the pulleys can be suppressed as low as possible regardless of the abnormalities of the hydraulic circuit.

According to the present invention, in order to accomplish the above and other objects, there is provided a control system for a steplessly variable transmission comprising a drive pulley and driven pulley formed with V-shaped grooves respectively, and endless belt engaged with both the grooves of the pulleys and tensioned between the pulleys to transmit engine torque therethrough, cylinder means provided on the pulleys for being subjected to a hydraulic pressure to vary an effective diameter of the pulleys so that a speed ratio (drive pulleys rotation speed/driven pulley rotation speed) of the transmission is continuously changed, hydraulic pressure supply means for introducing the hydraulic pressure into the cylinder means, line pressure control means for controlling a line pressure of a hydraulic circuit which controls operation of the cylinder means, line pressure detecting means for detecting the line pressure, torque detecting means for detecting the engine torque transmitted to the drive pulley, torque allowance computing means for computing a maximum allowable belt transmitting torque which is effectively transmitted from the drive pulley to the driven pulley through the belt under the line pressure detected by the line pressure detecting means, comparing means for comparing the maximum allowable belt transmitting torque with the torque detected by the torque detecting means, and torque control means for controlling a torque transmitted from the drive pulley to the driven pulley to a value smaller than the maximum torque when the engine torque detected by the torque detecting means is greater than the maximum allowable belt transmitting torque.

According to the present invention, provided that the line pressure of the hydraulic circuit for the pulley control is unduly lowered by an accident to reduce the maximum torque allowable to the belt below the engine torque transmitted from the engine to the drive pulley, the comparing means detects it so that the torque control means controls the torque transmitted from the drive pulley to the driven pully to a value smaller than the lowered maximum torque of the belt. Thus, under the condition in which the line pressure is unduly lowered, the slip between the the drive and driven pulleys can be effectively suppressed.

The above and other features of the present invention will become apparent from the following description in connection with the preferred embodiment taking reference with the accompanying drawings.

DESCRIPTION OF THE PREFERRED EMBODIMENTS

Figure 1:
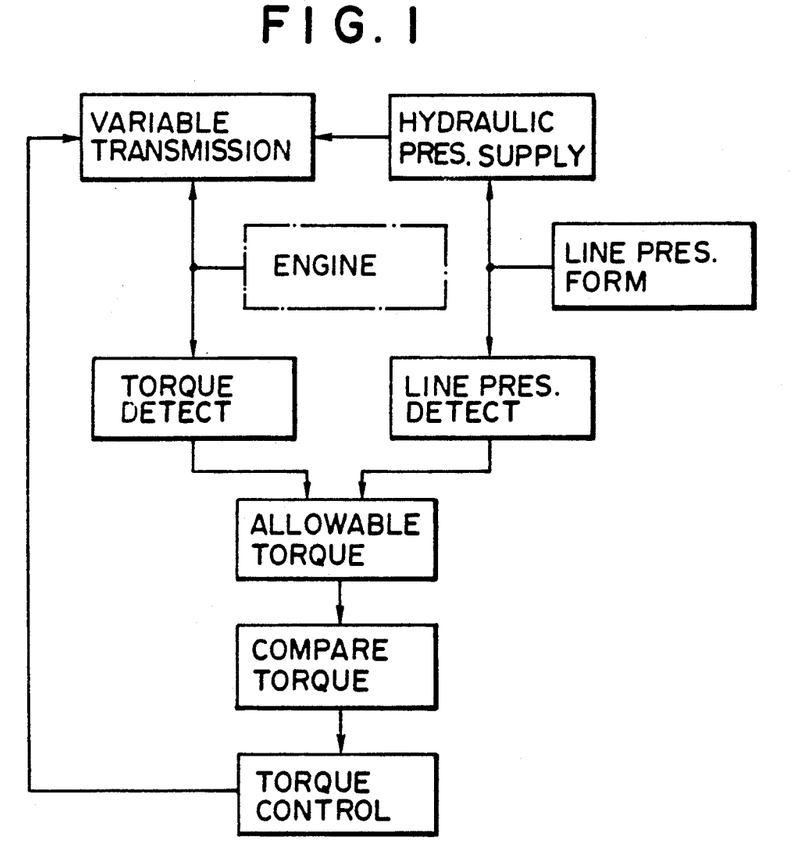
FIG. 1 is a schematic block chart of the control system of a vehicle having a steplessly variable transmission according to a preferred embodiment of the present invention.

Referring to FIG. 1, there is shown a block chart of a control system for a steplessly variable transmission in accordance with the preferred embodiment of the present invention.

A control system for a steplessly variable transmission is provided with hydraulic pressure supply device for introducing a hydraulic pressure into the transmission, a line pressure control device for controlling a line pressure of a hydraulic circuit which controls operation of the cylinder device, a line pressure detecting device for detecting the line pressure, a torque detecting device for detecting the engine torque transmitted to the drive pulley, a torque allowance computing device for computing a maximum allowable belt transmitting torque under the line pressure detected by the line pressure detecting device, a comparing device for comparing the maximum torque with the torque detected by the torque detecting device, and a torque control device for controlling a torque transmitted from the drive pulley to the driven pulley to a value smaller than the maximum torque when the engine torque detected by the torque detecting device is greater than the maximum allowable belt transmitting torque.

Figure 2:
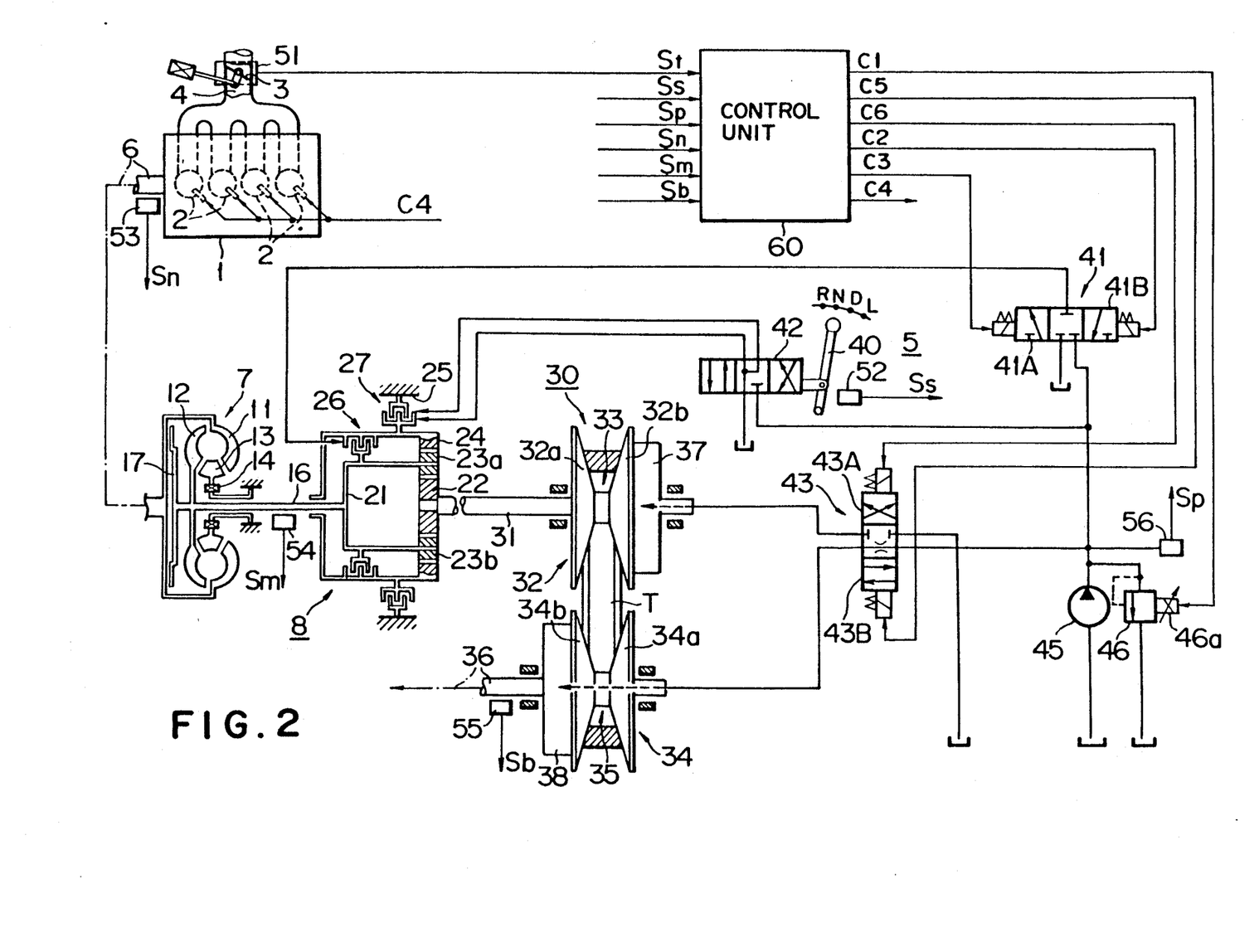
FIG. 2 is a schematic view of a hydraulic control system for a power train of the vehicle.

Referring to FIG. 2, an engine 1 is provided with four cylinders having ignition plugs 2. The engine 1 is provided with an intake passage 4 in which a throttle valve 3 is disposed. Intake gas is introduced into combustion chambers through respective divided intake passages having fuel injectors (not shown) for the cylinders. An engine 1 is provided with an output shaft 6. The output shaft 6 of the engine 1 is connected with a torque converter 7. Engine torque is transmitted from the output shaft 6 to the wheel driving mechanism through the torque converter 7, switching gear mechanism 8 for reverse and forward movement of the vehicle, and a steplessly variable transmission 30.

The torque converter 7 is provided with a pump impeller device 11 connected with the output shaft 6 of the engine 1 for rotation, turbine runner device 12 to which the engine torque is transmitted through the pump impeller 11, a stator device 13 disposed between the turbine runner 12 and the pump impeller 11, an one-way clutch 14 disposed between the stator and a support portion thereof and a lock-up clutch 17 brought into a spline engagement with a turbine shaft 16 to be disposed between the pump impeller 11 and the turbine runner 12. The lock-up clutch 17 is controlled by a hydraulic pressure introduced through a shift valve (not shown) in a hydraulic circuit 5 to take a lock-up condition, converter condition and slip condition selectively.

The switching gear mechanism 8 is provided with a carrier 21 connected with the tubine shaft 16 of the torque converter 7, a sun gear connected with an output shaft of the switching gear mechanism, pinion gears 23a and 23b meshed with the sun gear 22 and a ring gear 24 engaged with the pinon gears 23a and 23b. The switching gear mechanism 8 is also provided with a clutch 26 and brake 27 between the ring gear 24 and a case 25 thereof. In the switching gear mechanism 8, a hydraulic pressure is introduced from a solenoid valve 41 in the hydraulic circuit 5 into the clutch 26. A hydraulic pressure is introduced from a manual valve 42 shifted in response to an operation of a shift lever 40 by a driver into the brake 27 so that the clutch 26 and the brake 27 take an engaged position and a released condition selectively. As a result, R range (reverse range), N range (neutral range), D range (forward range or drive range) and L range are established in response to the shift position of the shift lever 40.

The steplessly variable transmission 30 is provided with an input shaft 31 connected with the switching gear mechanism 8 for rotation, a drive pulley 32 connected with the input shaft 31 and rotated integrally with the input shaft 31, a driven pulley 34 to which the rotation of the drive pulley 32 is transmitted through an endless belt with V-shaped configuration in section and an output shaft 36 connected with the driven pulley 34 and rotated integrally with the driven pulley 34 to transmit the rotation to a differential gear mechanism. The drive pulley 32 is provided with a stationary conical plate 32a and a movable conical plate 32b formed with a cylinder chamber 37. The stationary conical plate 32a and the movable conical plate 32b are disposed with conical portions thereof facing to each other to form a V-shaped groove 33 therebetween. The movable conical plate 32b is moved in accordance with the hydraulic pressure introduced from a cylinder control solenoid valve 43 into the cylinder chamber 37 in a direction of the rotation axis of the pulley 32 so that a distance between the stationary and movable conical plates 32a and 32b or a width of the groove 33 is changed. The driven pulley 34 is provided with a stationary conical plate 34a fixed to the output shaft 36 and a movable conical plate 34b formed with a cylinder chamber 38 having a pressure area smaller than the cylinder chamber 37. The conical plates 34a and 34b are disposed with conical portions thereof facing each other so that a V-shaped pulley groove 35 are defined. The movable conical plate 34b is moved in accordance with an operating pressure introduced through the cylinder control solenoid 43 into the cylinder chamber 38 in a direction of a rotation axis of the pulley 34 so that the distance between the stationary and movable conical plate or the width of the groove 35 is changed.

The belt T is engaged with the V-shaped grooves 33 and 35 to be tensioned between the pulleys 32 and 34.

Controlling the hydraulic pressure applied to the cylinder chambers 37 and 38, effective diameters of the pulley 32 and 34 are changed for the belt T so that the speed ratio of the transmission is continuously or steplessly changed. In addition, a maximum torque or an allowable belt transmitting torque that can be transmitted from the drive pulley 32 to the driven pulley 34 through the belt T without producing a substantial slip between the belt T and the pulleys 32 and 34 is defined in accordance with the hydraulic pressure applied to the cylinder chambers 37 and 38 of the movable conical members 32b and 34b.

A hydraulic pressure produced by an oil pump 45 is adjusted by a regulating solenoid valve 46 to form the line pressure of the hydraulic circuit 5. The line pressure formed by the solenoid valve 46 is introduced into the solenoid valve 41 for the clutch control, the manual valve 42, and the solenoid valve 43 for the cylinder control which produce hydraulic pressures for operating the respective objects.

The control system in accordance with the present invention is also provided with a control unit 60. The control unit 60 receives a signal St from a throttle opening sensor 51 for detecting throttle opening, a signal Ss from a shift position sensor 52 for detecting an operated position of the shift lever 40, a signal Sn from an engine speed sensor 53 for detecting an engine speed, a signal Sm from a turbine speed sensor 54 for detecting a rotation speed of the turbine shaft 16 as a turbine speed, a signal Sb from a transmission speed sensor 55 for detecting a rotation speed of the output shaft 36 of the steplessly variable transmission 30 and a signal Sp from a pressure sensor for detecting the line pressure of the hydraulic circuit 5. The control unit 60 produces drive pulse signals C1, C2, C3 and C4 which are provided for a solenoid 46a for the regulating solenoid valve 46, a releasing solenoid 41B of the clutch control solenoid valve 41 for releasing the clutch 26, an engaging solenoid 41A of the clutch control solenoid valve 41 for engaging the clutch 26 and ignitions plugs 2 for thereby controlling the line pressure, shift operation of the transmission and the ignition timing. The control unit 60 also provides a solenoid 43B for deceleration and a solenoid 43A for acceleration of the cylinder control solenoid valve 43 with pulse signals C5 and C6 selectively so as to control a belt transmitting torque which is transmitted from the drive pulley 32 to the driven pulley 34 through the belt T, the speed ratio of the transmission and the torque converter 7.

In the shift control by the control unit 60, when the shift lever 40 is positioned at the D range or the L range, the releasing pressure from the manual valve 42 is applied for the brake 28 of the switching gear mechanism 8 to be released. The engaging solenoid 41A of the clutch control solenoid 41 receives the pulse signal C3 to be turned on so that the hydraulic pressure from the solenoid valve 41 is applied for the clutch 26 of the switching gear mechanism 8 to be engaged. As a result, the rotation of the turbine shaft 16 of the torque converter 7 is transmitted to the input shaft 31 of the steplessly variable transmission 30 so that the input shaft 31 is rotated in the same direction as the turbine shaft 16.

On the other hand, when the shift lever 40 is positioned at the R range, the operating pressure from the manual valve 42 is applied for the brake 27 to be engaged. Concurrently, the pulse signal C2 is supplied to the releasing solenoid 41B of the clutch control solenoid valve 41 to be turned off so that the clutch 26 of the switching gear mechanism 8 is released. As a result, the rotation of the turbine shaft 16 is transmitted to the input shaft 31 of the steplessly transmission 30 so that the input shaft is rotated in a direction opposite to the turbine shaft 16.

When the shift lever 40 is positioned at the N range, the hydraulic pressure from the manual valve 42 is applied for the brake 27 to be released. The pulse signal C2 is applied to the releasing solenoid 41B of the solenoid valve 41 to be turned off so that the clutch 26 is released. Thus, under the N range, the rotation of the turbine 16 is not transmitted to the input shaft 31 of the transmission 30.

When the shift lever 40 is in the D or L range so that the turbine rotation is transmitted to the input shaft 31 to be rotated in the same direction, the condtrol unit 60 carries out a speed ratio control in which the speed ratio is changed. In this control, when the vehicle is in a condition in which an up shift operation is needed, the signal C6 is applied to the accelerating solenoid 43A of the cylinder control valve 43 to be actuated so that the hydraulic pressure from the solenoid valve 43 is introduced into the cylinder chamber 37 in accordance with the signal C6. As a result, the movable conical plate 32b is moved toward the stationary conical plate 32a to reduce the width of the groove 33 so that the effective diameter for the belt T is increased. Concurrently, the hydraulic pressure of the cylinder chamber 38 is reduced in accordance with the pulse signal C6 through the cylinder control valve 43 so that the movable conical plate 34b is moved away from the stationary conical plate 34a to increase the width of the groove 35. Thus, the effective diameter of the pulley 34 for the belt T is reduced. As a result, the speed ratio of the steplessly variable transmission is reduced to accomplish the up shift operation.

On the other hand, when the vehicle is in a condition in which a down shift operation is needed, the drive pulse signal C5 is provided for the decelerating solenoid 43B of the cylinder control solenoiid to be actuated. Thus, the hydraulic pressure from the cylinder control solenoid valve 43 is introduced into the cylinder chamber 38 of the steplessly variable transmission 30 in response to the signal C5 so that the movable conical plate 34b of the driven pulley is moved toward the stationary conical plate 34a to reduce the width of the pulley groove 35 to thereby increase the effective diameter of the pulley 34 for the belt T. Concurrenlty, the hydraulic pressure is withdrawn from the cylinder chamber 37 through the cylinder control valve 43 by virtue of the signal C5 so that the movable conical plate 32b is moved away from the stationary conical plate 32a to increase the width of the pulley groove 33 to thereby reduce the effective diameter of the pulley 32 for the belt T. Thus, the speed ratio of the trasnmission 30 is increased to accomplish the down shift operation.

It is necessary for this steplessly variable transmission 30 to have the allowable belt transmitting torque greater than a value transmitted to the input shaft 31. The allowable belt transmitting torque depends on an urging pressure or a grip pressure acting on the belt through the drive and driven pulleys 32 and 34 wherein the urging pressure is provided by the hydraulic pressure introduced into the cylinder chambers 37 and 38. Therefore, the line pressrue by the control unit 60 is so controlled that the hydraulic pressure for the chambers 37 and 38 can provide the allowable belt transmitting torque greater than the value transmitted to the input shaft 31.

Figure 3:
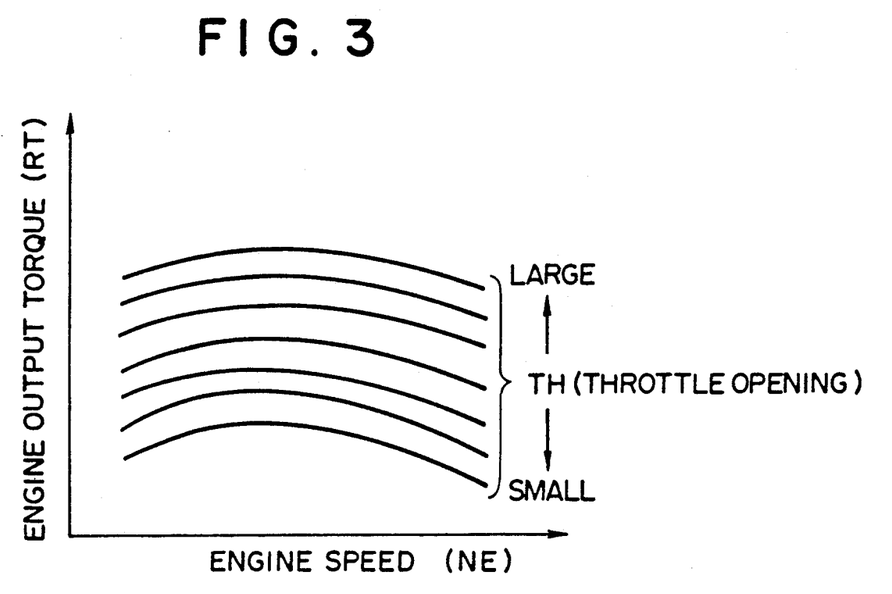
FIG. 3 is a graphical representation showing a relationship among an engine output torque, an engine speed and a throttle opening.
Figure 4:
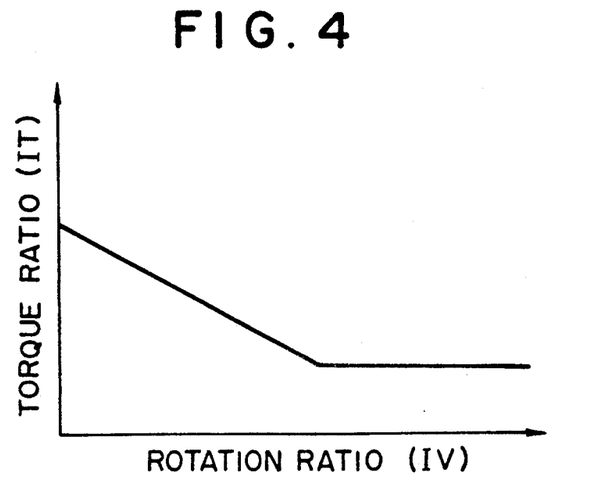
FIG. 4 is a graphical representation showing a relationship between a torque ratio and a rotation ratio.

Such line pressure control is carried out by providing the control solenoid 46a of the regurating solenoid valve 46 with the drive pulse signal C1. In this case, the regulating valve 46 controls a flow of hydraulic fluid therefrom in accordance with the signal C1 so as to control the line pressure. The drive pulse signal C1 is formed in the control unit 60 in accordance with the following procedure. At first, an engine output torque RT generated in the engine 1 is computed based on the engine speed NE denoted by the signal Sn and the throttle opening TH denoted by the signal St in light of a map as shown in FIG. 3. The map is stored in a memory in the control unit 60. A converter rotation ratio IV between the rotation speed of the pump impeller 11 and that of the turnbine runner 12 is computed based on the signals Sm and Sn respectively. Then, a torque ratio IT in the torque converter 7 is obtained based on the converter rotation ratio IV in light of a map as shown in FIG. 4 which is stored in the memory of the control unit 60. A drive pulley input torque RK introduced into the drive pulley 32 through the input shaft 31 is computed based on the engine output torque RT and the torque ratio IT.

Figure 5:
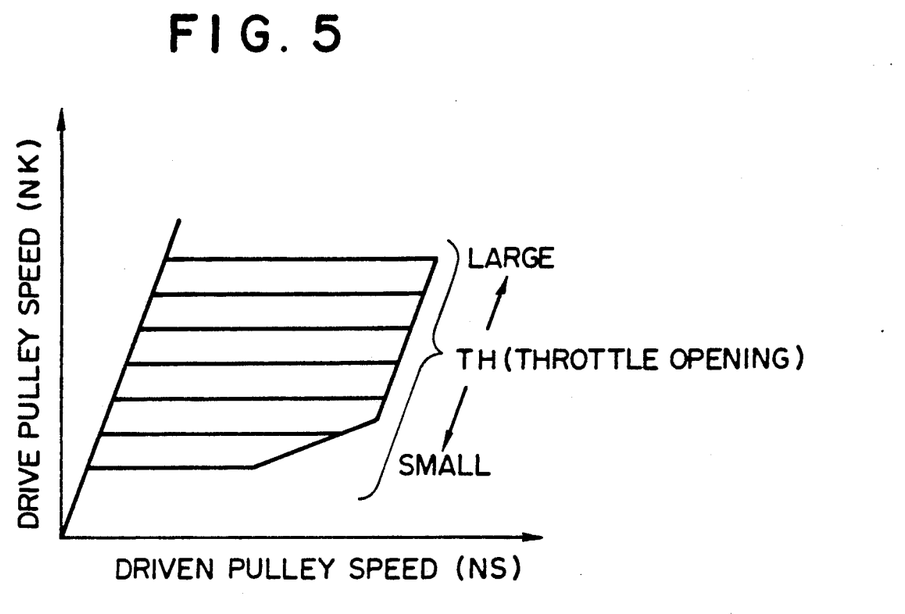
FIG. 5 is a graphical representation showing a relationship among a drive pulley speed, driven pulley speed and the throttle opening.

There is prepared a map as shown in FIG. 5 in which a relationship is provided among the rotation speed NS of the driven pulley 34, the rotation speed NK of the drive pulley 32 and the throttle opening TH of the throttle valve 3. The map is stored in the memory of the control unit 60. Thus, the drive pulley speed NK is obtained based on the throttle opening TH denoted by the signal St and the driven pulley speed NS denoted by the signal Sb. A rotation ratio (IH) of the steplessly variable transmission is defined by a ratio between the driven pulley speed NS to the drive pulley speed NT (driven pulley speed NS/drive pulley speed NT).

Figure 6:
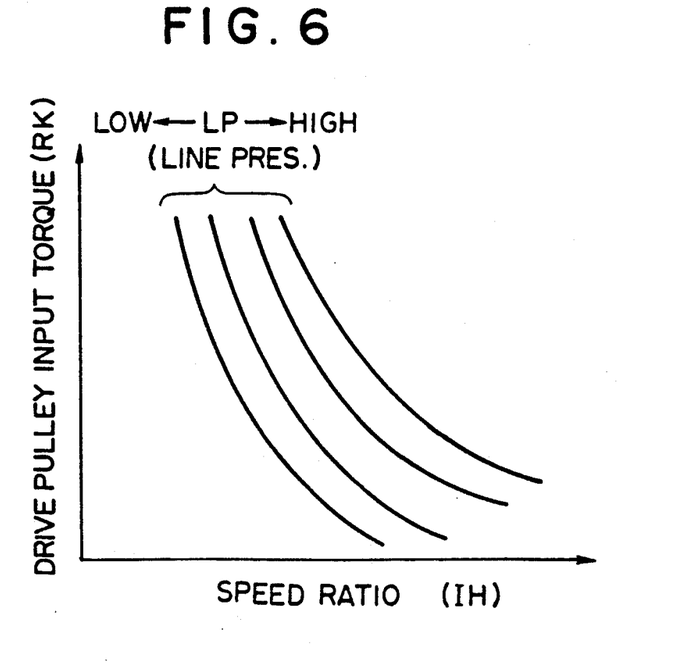
FIG. 6 is a graphical representation among the drive pulley input torque, speed ratio and line pressure.

There is also prepared a data map as shown in FIG. 6 in which a relationship among the maximum value of the rotation ratio (IH), the drive pulley torque RK and the line pressure (LP) is provided. The map is stored in the memory of the control unit 60. The line pressure (LP) is provided based on the rotation ratio (IH) and the drive pulley input torque RK.

The line pressure (LP) obtained through the above procedure indicates such a minimum value that can provide the drive and driven pulleys 32 and 34 with the allowable belt transmitting torque equal to the drive pulley input torque RK.

Thus, the drive pulse signal C1 introduced into the solenoid 46a of the regulating valve 46 is so formed that the line pressure LP denoted by the signal Sp from the pressure sensor 56 have a value greater than the minimum value in a delivery side of the oil pump 45.

When a computed value of the pulley input torque RK or the allowable belt transmitting torque obtained based on the line pressure LP and the rotation ratio (IH) is reduced below an actual value of the drive pulley input torque RK which is obtained based on the engine output torque RT and the torque ratio IT, the control unit 60 judges that there occurs an abnormality in the signal C1 or in the regulating solenoid valve 46. In this case, the actual torque transmitted from the drive pulley 32 to the driven pulley 34 through the belt T is controlled to be lowered below the allowable belt transmitting torque which is reduced because of the abnormality. For example, the actual torque can be reduced by reducing the engine out put torque RT or by reducing the rotation ratio (IH) in the transmission 30.

In order to reduce the engine output torque RT, the ignition timing of the engine is controlled to be retarded. Alternatively, the fuel supply is temporairy suspended to reduce the engine output torque RT.

Figure 7:
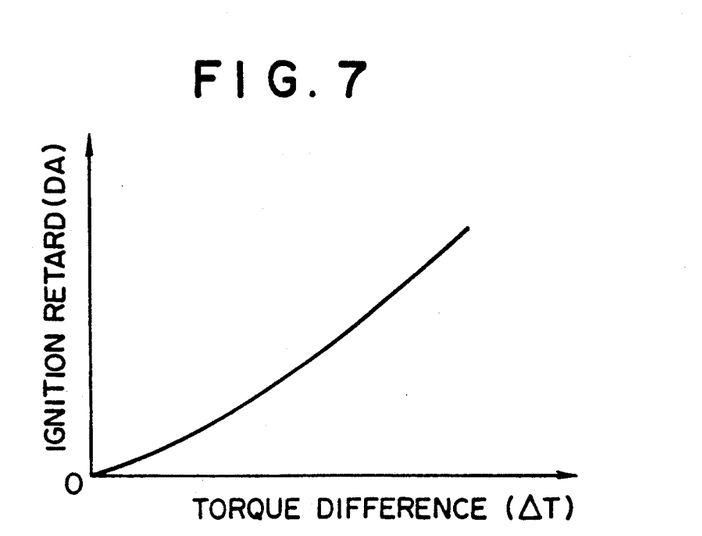
FIG. 7 is a graphical representation between an ingnition timing retard and a torque difference.

In controlling the ignition timing of the engine 1, a torque difference dT between the actual drive pulley input torque RK and the allowable belt transmitting torque is computed so that an ignition retard DA is computed in light of a map as shown in FIG. 7 which is stored in the control unit 60.

When the control is made with regard to the rotation ratio (IH), the maximum value IHt of the rotation ratio (IH) is obtained through the map shown in FIG. 6 based on the line pressure LP and the actual drive pulley input torque RK.

A target maximum rotation speed NSt of the driven pulley 34 is computed based on the drive pulley speed NK denoted by the signal Sm and the target maximum rotation ratio IHt. The drive pulse signal C5 is introduced into the decelerating solenoid 43B of the valve 43 to control the width of the groove 35 of the driven pulley 34 such that the rotation speed NS of the driven pulley 34 is maintaind at a value smaller than the maximum target rotation speed NSt.

According to the above control, when the abnormality occurs in the drive pulse signal C1 or in the solenoid 46a of the regulating valve 46 to reduce the allowable belt transmitting torque, the actual belt transmitting torque is reduced below the allowable belt transmitting torque so that the slip between the belt T and the pulleys 32 and 34 can be suppressed. In addition, the drivability of the vehicle is not deteriorated.

In order to carry out the above control, the control unit 60 is commonly constituted by including a microcomputer.

Hereinafter, there is described a control as aforementioned taking reference with a flowchart shown in FIG. 8.

The control unit 60 reads signals sensed by various sensors (step 70). In step 71, the control unit 60 judges as to whether or not the shift lever 40 is in the D range or L range based on the signal Ss. If the judgement is no or if the shift lever 40 is neither in the D range nor the L range, the procedure returns to the step 70. If the judgement in step 71 is yes or the shift lever is in the D range or L range, the control unit 60 computes the engine output torque RT based on the engine speed NE denoted by the signal Sn and the throttle opening TH denoted by the signal St in light of the map as shown in FIG. 3 (step 72). In step 73, the control unit 60 obtains the converter rotation ratio IV of the turbine runner 12 against the pump impeller 11 based on the signals Sm and Sn. Then, the control unit 60 obtains the torque ratio IT in the torque coverter 7 based on the converter rotation ratio IV in light of the map shown in FIG. 4. In step 74, the control unit 60 computes the actual drive pulley input torque RK by multiplying the engine output torque RT into the torque ratio obtained through the procedure in step 73. In step 75, the rotation speed NK of the drive pulley 32 is obtained based on the throttle opening TH denoted by the signal St and the driven pulley speed NS denoted by the Sb in light of the map shown in FIG. 5. In step 76, the rotation ratio (IH) is obtained by computing a ratio of the driven pulley speed NS against the drive pulley speed NK. In step 77, the drive pulley input torque RK or the allowable belt transmitting torque (hereinafter referred to as RKL) is obtained based on the line pressure LP denoted by the signal Sp and the rotation ratio (IH) in light of the map shown in FIG. 6.

In step 78, the control unit 60 judges as to whether or not the the allowable belt transmitting torque RKL is greater than the drive pulley input torque RK. If the judgment is yes or if the allowable belt transmitting torque RKL is greater than the drive pulley input torque RK, the control unit 60 provides a basic duty Dd as a control duty DD in step 79, forms the drive pulse signal C4 with a pulse width corresponding to the control duty DD and produces the signal C4 on the ignition plug 2. Then the procedure returns to the initial step. Thus, the ignition timing is maintained at a value under a normal condition.

If the judgment is no or the allowable belt transmitting torque is smaller than the drive pulley input torque RK in step 78, the control unit computes the torque difference dT between the drive pulley input torque RK and the allowable belt transmitting torque RKL and obtains the ignition timing retard DA based on the torque difference dT in light of the map shown in FIG. 7. In step 82, the control unit 60 sets a compensation duty Da in accordance with the ignition timing retard DA and adds the compensation duty Da to the basic duty Dd to get the control duty DD. Then the procedure goes to the step 80. In step 80, the control unit 60 forms the drive pulse signal C4 having a pulse width corresponding to the control duyt DD and produces the signal on the ignition plug 2. Then, the procedure returns to the initial step. As a result, the ignition timing is retarded in comparison with the normal ignition timing by a time period corresponding to the ignition timing retard to reduce the engine output torque RT.

In the above control, the ignition timing is retarded in response to the undesirable reduction of the allowable belt transmitting torque to reduce the engine output torque.

The engine output torque can be controlled to be reduced in response to the abnormality of the solenoid valve 46 and the signal C1 by controlling the rotation ratio (IH).

Figure 9:
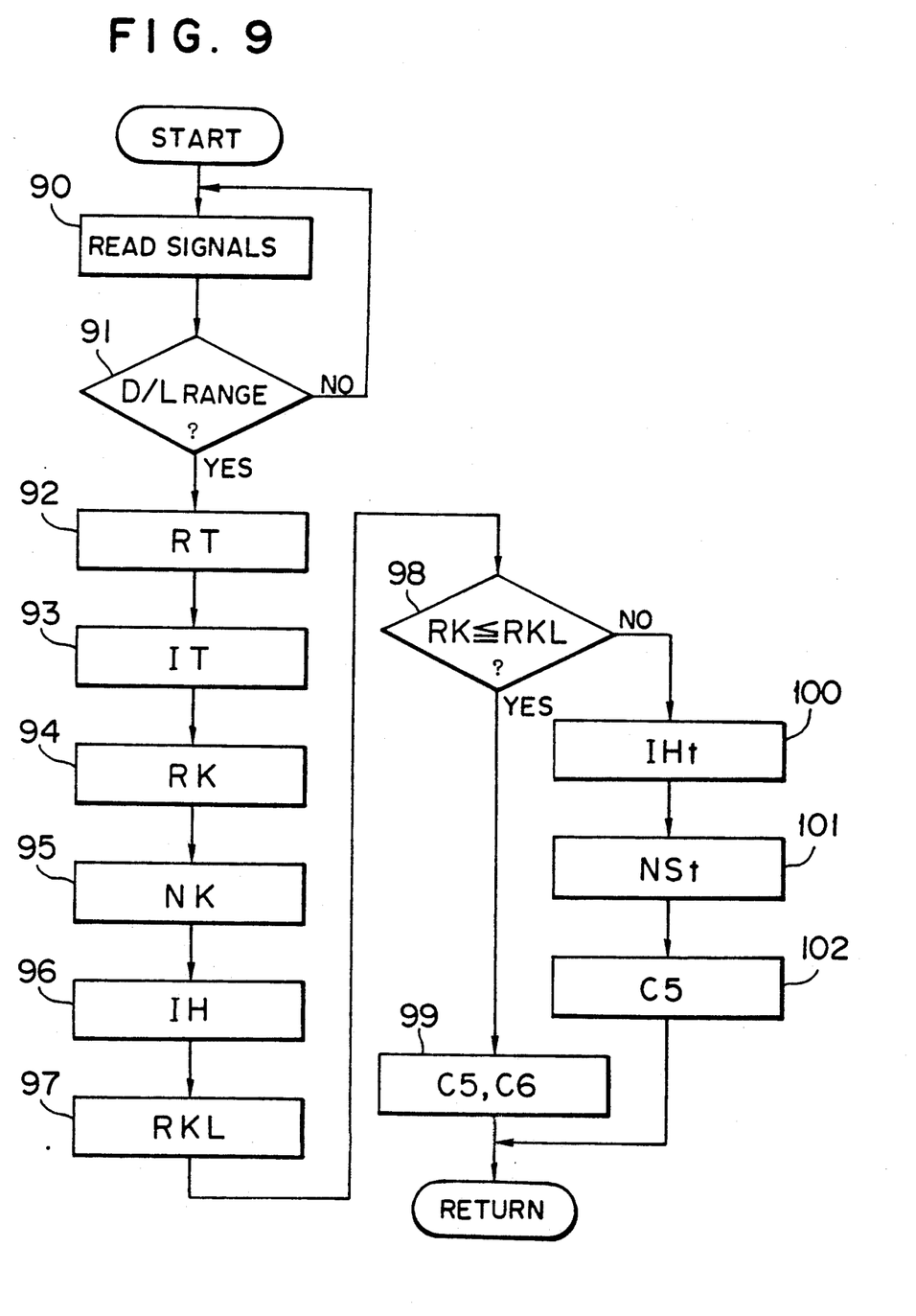
FIG. 9 is a flowchart of an engine output control in accorance with the present invention but showing another embodiment.

Hereinafter, there is described a control of the speed ratio in the case of the undesirable reduction of the allowable belt transmitting torque taking reference with a flowchart shown in FIG. 9.

Figure 8:
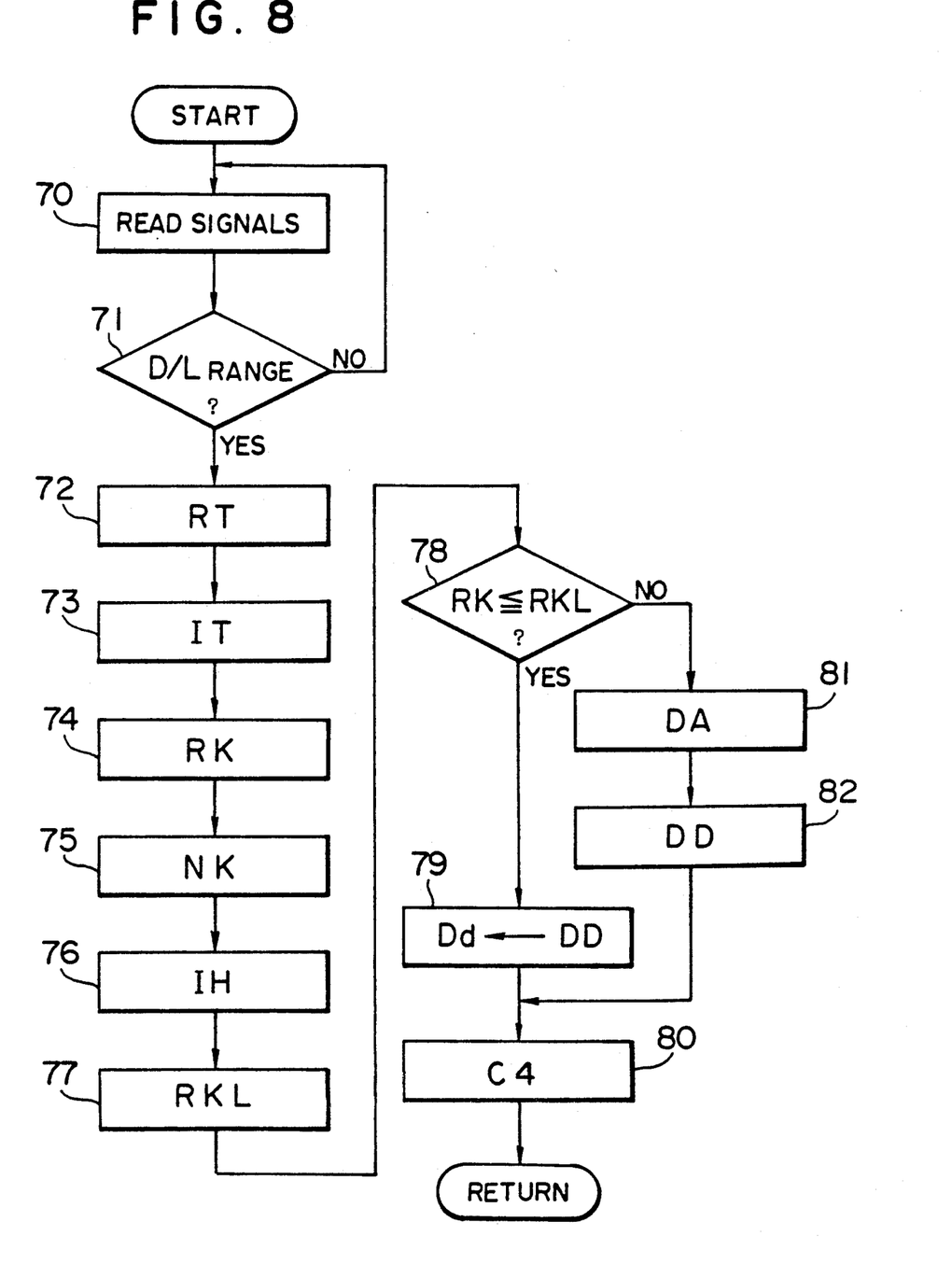
FIG. 8 is a flowchart of an engine output control in accordance with the present invention.

In this control, the procedure from steps 90 to 98 is carried out in a similar way to the control shown in FIG. 8 in which a judgment is made as to whether or not the the allowable belt transmitting torque RKL is greater than the drive pulley input torque RK eventually.

In the judgment of step 98, if the allowable belt transmitting torque RKL is greater than the drive pulley input torque RK, the drive pulse signals C5 and C6 applied to the solenoids 43A and 43B of the cylinder control solenoid valve 43 are not changed. Then, the procedure returns to the initial step. On the other hand, in the judgment in step 98, if the allowable belt transmitting torque RKL is smaller than the drive pulley input torque RK, the target maximum rotation ratio IHt is obtained based on the line pressure denoted by the signal Sp and the actual drive pulley input torque RK in light of the map shown in FIG. 6 in step 100. In step 101, the target maximum rotation speed of the driven pulley 34 is obtained based on the target maximum rotation ratio IHt and the rotation speed NK of the drive pulley 32 denoted by the signal Sm. In step 102, the control unit 60 produces the drive pulse signal C5 to the decelerating solenoid 43B of the cylinder control solenoid valve 43 so that the driven pulley speed NS is maintained at a value smaller than the target maximum speed NSt. Thereafter, the procedure returns to the initial step. According to the above control, the speed ratio in the transmission 30 is increased in response the value of the singal C5 so that the actual belt transmitting torque actually introduced from the drive pulley 32 to the driven pulley 34 through the belt T is reduced below the allowable belt transmitting torque.

In the above control, the maximum target speed of the drive pulley speed is computed so that the groove width of the driven pulley is controlled to provide the actual driven pulley speed with a value greater than the maximum target speed. In other words, the rotation ratio is controlled to be decreased similar to the down shift control as aforementioned.

Alternatively, a target maximum rotation speed of the drive pulley 32 is computed and the groove width of the drive pulley 32 is controlled so that the actual rotation speed of the drive pulley 32 is not increased beyond the maximum rotation speed computed.

While the invention has been specifically described in connection with preferred embodiments thereof, it will be understood by the those skilled in the art that the foregoing and other changes or modifications in form and details can be made without departing from the spirit and scope of the invention, and that all of them will fall in the scope of the invention as claimed.

What is claimed is:

1. A control system for a steplessly variable transmission comprising;
   a drive pulley and driven pulley formed with V-shaped grooves respectively,
   an endless belt engaged with the both grooves of the pulleys and tensioned between the pulleys to transmit an engine output torque therethrough,
   cylinder means provided on the pulleys for being subjected to a hydraulic pressure to vary an effective diameter of the pulleys so that a speed ratio of the transmission is continuously changed,
   hydraulic pressure supply means for introducing the hydraulic pressure into the cylinder means,
   line pressure control means for controlling a line pressure of a hydraulic circuit which controls operation of the cylinder means,
   line pressure detecting means for detecting the line pressure,
   torque detecting means for detecting the engine torque transmitted to the drive pulley,
   torque allowance computing means for computing a maximum allowable belt tramsitting torque which is effectively transmitted from the drive pulley to the driven pulley through the belt under the line pressure detected by the line pressure detecting means,
   comparing means for comparing the maximum allowable belt transmitting torque with the torque detected by the torque detecting means, and
   torque control means for controlling a torque transmitted from the drive pulley to the driven pulley to a value smaller than the maximum torque when the engine torque detected by the torque detecting means is greater than the maximum allowable belt transmitting torque.

2. A control system as recited in claim 1 wherein the torque control means reduces an actual torque transmitted from the drive pulley to the driven pulley.

3. A control system as recited in claim 2 wherein the torque control means controls the hydraulic pressure to increase the speed ratio.

4. A control system as recited in claim 1 wherein the torque control means reduces the engine output.

5. A control system as recited in claim 4 wherein the torque control means retards an ignition timing.

6. A control system as recited in claim 1 wherein the engine output torque is obtained based on a throttle valve opening and an engine speed.

7. A control system as recited in claim 1 wherein the speed ratio is obtained based on a rotation speed of the driven pulley and a throttle opening.

8. A control system as recited in claim 1 wherein the maximum allowable belt transmitting torque is obtained based on a rotation speed of the driven pulley and the line pressure.

9. A control system as recited in claim 8 wherein a minimum line pressure under a condition where the maximum allowable belt transmitting torque is equal to a drive pulley input torque which is transmitted to the drive pulley from the engine is provided based on the drive pulley input torque and the speed ratio.

* * * * *